United States Patent [19]

Hertfelder et al.

[11] 4,270,726
[45] Jun. 2, 1981

[54] VALVE ARRANGEMENT, ESPECIALLY FOR CONTROLLING FLOW OF HOT WATER THROUGH A HEATING DEVICE FOR MOTOR VEHICLES

[75] Inventors: Wilhelm Hertfelder, Steinenbronn; Erich Junginger, Stuttgart; Ernst Linder, Mühlacker, all of Fed. Rep. of Germany

[73] Assignee: Robert Bosch GmbH, Stuttgart, Fed. Rep. of Germany

[21] Appl. No.: 16,062

[22] Filed: Feb. 28, 1979

[30] Foreign Application Priority Data

Mar. 9, 1978 [DE] Fed. Rep. of Germany ....... 2810211

[51] Int. Cl.³ ............................................. F16K 31/02
[52] U.S. Cl. ........................................ 251/30; 251/38
[58] Field of Search ................. 251/30, 45, 46, 129, 251/38

[56] References Cited

U.S. PATENT DOCUMENTS

| | | | |
|---|---|---|---|
| 2,379,181 | 6/1945 | Pontius et al. | 251/30 |
| 2,827,923 | 3/1958 | Sadler | 251/129 |
| 2,936,780 | 5/1960 | Pratt | 251/38 |
| 2,946,551 | 7/1960 | Kovach | 251/30 |
| 2,968,464 | 1/1961 | Olson | 251/30 |
| 3,059,892 | 10/1962 | Windsor | 251/30 |
| 3,079,952 | 3/1963 | Miller | 251/30 |
| 3,208,716 | 9/1965 | Rolfe | 251/30 |
| 3,799,497 | 3/1974 | Zeuner | 251/30 |
| 3,943,975 | 3/1976 | Schnittker | 251/30 |
| 3,967,808 | 7/1976 | Lieding | 251/46 |
| 3,989,222 | 11/1976 | Yoshiyasu | 251/30 |

FOREIGN PATENT DOCUMENTS 1227299 10/1966 Fed. Rep. of Germany ............ 251/30

*Primary Examiner*—Martin P. Schwadron
*Assistant Examiner*—G. L. Walton
*Attorney, Agent, or Firm*—Michael J. Striker

[57] ABSTRACT

A valve arrangement, especially for controlling flow of hot water through a heating device of a motor vehicle, mainly comprises a closed housing provided with an inlet chamber and an outlet chamber communicating with each other through an opening forming a valve seat, and a valve member movable relative to the valve seat for opening and closing the opening. The arrangement includes further a flexible membrane which is clamped at its outer periphery to the housing and which forms a control chamber at the side of the inlet chamber facing away from the valve seat. The valve member is operated by an electromagnet which acts also on an auxiliary valve member in the control chamber to create during movement of the valve member toward the valve seat a higher pressure in the control chamber than in the outlet chamber and during movement of the valve member away from the valve seat a lower pressure in the control chamber than in the inlet chamber.

11 Claims, 2 Drawing Figures

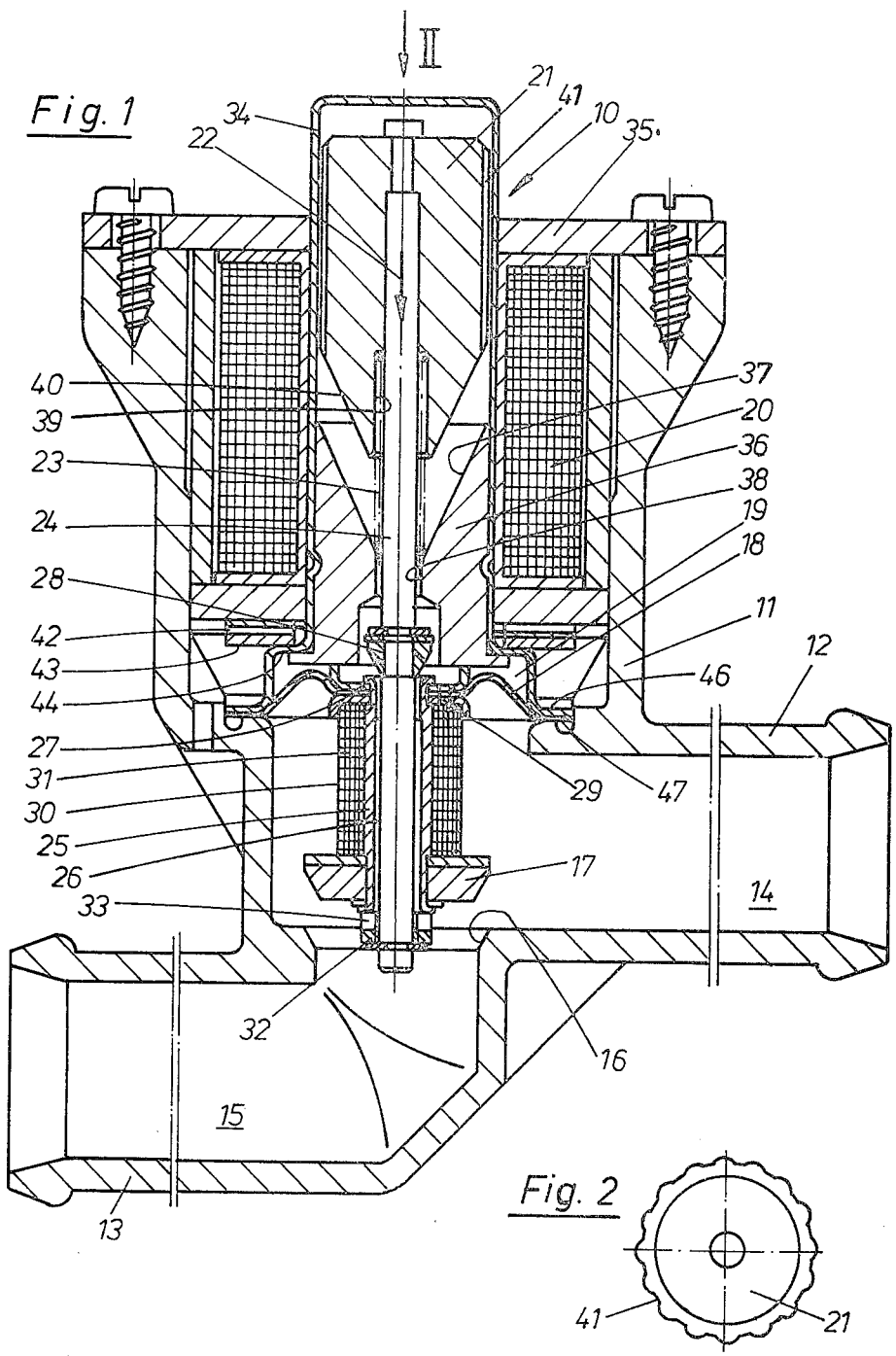

VALVE ARRANGEMENT, ESPECIALLY FOR CONTROLLING FLOW OF HOT WATER THROUGH A HEATING DEVICE FOR MOTOR VEHICLES

BACKGROUND OF THE INVENTION

The present invention relates to a valve arrangement, especially for controlling flow of hot water through a heating device for motor vehicles. The arrangement mainly comprises a substantially closed housing having an inlet chamber and an outlet chamber communicating with each other through an opening forming a valve seat, which may be closed and opened by a valve member operated by an electromagnet within the housing. The arrangement includes further a flexible membrane clamped at its outer periphery to the housing and forming on one side of the inlet chamber facing away from the valve seat a control chamber. The electromagnet acts also on an auxiliary valve member arranged in the control chamber and cooperating with an auxiliary valve seat in the membrane in such a manner that during movement of the valve member in valve closing direction a higher pressure will be created in the control chamber than prevails in the outlet chamber and during movement of the valve member away from the valve seat a lower pressure will be created in the control chamber than in the inlet chamber.

A known hot water controlling valve of this kind, disclosed in the German Offenlegungsschrift No. 25 31 015 operates with underpressure as servo-force. For this purpose the auxiliary valve member comprises a leaf spring which is operated by the electromagnet. The leaf spring is arranged in the control chamber. It closes with its resilient end, when the electromagnet is deenergized and the opening between the inlet chamber and the outlet chamber is closed, an underpressure conduit communicating with the control chamber. If the opening through which the inlet chamber communicates with the outlet chamber has to be opened, the electromagnet has to be energized. It attracts then the leaf spring which in turn opens the underpressure conduit communicating with the control chamber and at the same time closes another opening through which the control chamber communicates with the surrounding atmosphere. In this way an underpressure will be created in the control chamber during opening of the valve. Thereby the valve member moves away against the action of a closer spring from the aforementioned opening so that the valve is opened and hot water may pass the valve and flow into a heat exchanger. In the valve closing position the electromagnet controlling movement of the valve member is deenergized, but in the valve open position the electromagnet has to be continuously energized, which is of disadvantage. A further disadvantage is that the opening movement of the valve depends on the magnitude of the underpressure created in the control chamber. This magnitude of the underpressure may, however, during certain operating conditions of the motor vehicle not be sufficient to always assure movement of the valve in opening direction. Thus, for instance, in motor vehicles constructed to prevent obnoxious exhaust gases to penetrate into the atmosphere, the underpressure in certain extreme full load conditions of the vehicle, is insufficient to assure an opening movement of the valve. This disadvantage occurs also in Diesel engine operated vehicles. A further disadvantage resides in that the valve will not open when the underpressure conduit communicating with the control chamber leaks or is inadvertently disconnected. The safety of operation of this known arrangement is also endangered in that during a leak of the membrane water may flow to the outside of the valve, which may lead to a malfunction of the heating arrangement and which may also lead to a damage of the whole heating arrangement and to the engine of the vehicle.

SUMMARY OF THE INVENTION

It is an object of the present invention to provide a valve arrangement, especially for controlling flow of hot water through a heating device for motor vehicles, which avoids the disadvantages of such valve arrangements known in the art.

It is a further object of the present invention to provide a valve arrangement of the aforementioned kind which is constructed in such a manner that the electromagnet operating the valve member is deenergized to open the valve so that the energy requirements for this arrangement are reduced as compared with the known arrangement.

It is an additional object of the present invention to provide a valve arrangement of the aforementioned kind which does not require a separate underpressure conduit communicating with the control chamber, to thus be independent of operation determined fluctuations of such underpressure.

It is yet another object of the present invention to provide a valve arrangement of the aforementioned kind in which detrimental leaks and water losses are positively prevented and in which the whole arrangement may be constructed in a compact manner, of small weight and assuring a proper function during extended use.

With these and other objects in view, which will become apparent as the description proceeds, the valve arrangement according to the present invention, especially for controlling flow of hot water through a heating device for motor vehicles, mainly comprises a housing having an inlet chamber and an outlet chamber communicating with each other through an opening forming a valve seat, a valve member movable between an open position spaced from the valve seat and a closed position engaging the valve seat, means for moving the valve member between said positions thereof and comprising an electromagnet having a magnet coil coaxial with the valve seat, a dip armature axially movable in the coil in valve closing direction upon energizing of the coil, spring means cooperating with the armature and biasing the same in valve opening direction, a rod coaxially fixed to the armature extending through and beyond the valve member, a sleeve extending with radial clearance about a portion of the rod to be axially movable with respect thereto and having a lower end portion to the outer periphery of which the valve member is fixed and an upper end portion forming an auxiliary annular valve seat, a flexible membrane having an inner peripheral portion fixed to the outer periphery of the upper end portion of the sleeve and an outer peripheral portion fixed to the housing to form to one side of the inlet chamber a control chamber, an auxiliary valve member fixed to the rod between the armature and the sleeve and engaging during movement of the rod in valve closing direction the auxiliary valve seat before the valve member engages the valve seat, and a throttle opening in the membrane providing communication between the control chamber and the inlet chamber and having an open cross-section dimensioned that during movement of the valve member to the closed position a quick flow of water from the inlet chamber into the control chamber and therewith a pressure equalization between said two chambers will occur and so that during movement of the valve member to the open position with preceding movement of said auxiliary valve member away from said auxiliary valve seat, more water will flow out of said control chamber through the clearance between the sleeve and the rod than can flow into the control chamber through the throttle opening.

The valve according to the present invention is thus held in open position when the electromagnet is not energized and it is held in this open position even if the spring biasing the valve member to the open position should break. If the valve has to be moved to the closed position, the electromagnet has to be energized. Upon energizing of the magnet a quick closing movement will occur which is started in that the armature together with the rod is initially moved in closing direction. At the start of this movement, the membrane together with the sleeve and the valve member do not yet move in closing direction. During the first part of the closing movement in which the armature and the rod move in closing direction, the auxiliary valve member fixed to the rod is moved to the closed position in which the auxiliary valve member engages the coordinated auxiliary valve seat to close thereby the connection of the control chamber with the outlet chamber over the clearance between the rod and the sleeve. Thereby a pressure will be maintained in the control chamber substantially equal to that in the inlet chamber. This pressure is higher than that in the outlet chamber since the pressure in the outlet chamber decreases during start of the closing movement. Through the throttle opening in the membrane a quick equivalization between the pressure in the inlet chamber and the control chamber will occur. This will expedite the closing movement of the valve member. The energy requirement for the electromagnet to close the valve is therefore very small and the temperature control arrangement for controlling the electromagnet may be constructed for a small current. It has been shown that for closing the valve a current smaller than 1 ampere is sufficient. The spring biasing the valve member to the open position is compressed during movement of the armature into the magnet coil. As soon as the auxiliary valve engages the valve seat, the sleeve together with the membrane and the valve member is, during further movement of the armature into the magnet coil, moved in closing direction so that the valve member will engage the valve seat and thereby prevent further flow of the water from the inlet chamber into the outlet chamber. The auxiliary valve member is preferably formed from elastic material, especially of rubber. Advantageous in such a construction is that the auxiliary valve member together with the auxiliary valve seat forms a centralizing device for the sleeve and the valve member connected thereto. The auxiliary valve member may, for instance, have a conical shape so that during engagement of the conical auxiliary valve member with the correspondingly constructed auxiliary valve seat at one end of the sleeve, the latter together with the valve member connected thereto will be centralized relative to the rod.

If the valve has to be moved to the open position the electromagnet will be de-energized. Thereby the armature together with the rod and the auxiliary valve member connected thereto will be moved by the expanding spring in opening direction. This will disengage the auxiliary valve member from its auxiliary valve seat. Thereby the control chamber is connected through the clearance between sleeve and rod with the outlet chamber so that the pressure in the control chamber will be reduced to the lower pressure of the outlet chamber. The water in the control chamber can thus flow relatively fast through the opened aforementioned clearance into the outlet chamber. By appropriately dimensioning the throttle opening in the membrane such flow of water from the control chamber through the outlet chamber will occur faster than flow of water from the inlet chamber of higher pressure in the control chamber. Due to the pressure difference between inlet chamber and control chamber which acts on the membrane, the latter will be loaded and moved in opening direction. Thereby the sleeve fixed to the membrane and the valve member fixed to the sleeve will be moved in opening direction, whereby a relative movement between sleeve and rod will occur. Due to the pressure decrease occurring at the throttle opening during movement of the valve to the open position, the movement of the valve in this direction will be supported. The throttle opening in the membrane is so proportioned that, on the one hand, a sufficient servoaction during opening movement will be obtained and, on the other hand, a quick pressure equivalization during closing movement of the valve will be assured. In the open position the valve is held, on the one hand, by the spring biasing the armature in the opening direction and, on the other hand, by the pressure in the inlet chamber acting on the membrane, which holds the valve in open position even when the aforementioned spring should break. This will assure the functional safety of the valve arrangement. As mentioned before, in the open position of the valve the electromagnet is de-energized while the electromagnet requires only little energy in order to move the valve to the closed position. An advantage of the arrangement according to the present invention is further that it requires no separate control medium, having a pressure depending on the operating conditions of the vehicle, to be fed into the control chamber. The proper function of the valve is thus independent of the respective operating condition of the vehicle, especially independent of the loading of the motor driving the vehicle. Nevertheless, the valve will operate in opening and closing direction with an auxiliary force depending on the pressure in the inlet, respectively the outlet chamber. Since the housing is closed towards the outside, a leak or a destruction of the membrane will not lead to a water loss through the valve which may damage the servo system. The valve according to the present invention forms a compact unit of small weight and high safety as to its function.

According to a further advantageous feature of the present invention an annular sieve surrounds the sleeve wih radial clearance and forms about the sleeve an annular sieve space closed at opposite ends by the valve member and the membrane, respectively, and the throttle opening in the membrane communicates with the sieve space. This will assure that foreign particles, such as sand or other impurities carried by the water, will not penetrate into the control chamber. This will increase the safety of operation of the valve arrangement, especially with respect to the armature since foreign particles penetrating into the region of the armature would detrimentally affect the axial movement of the latter.

According to a further feature of the present invention the housing includes an insert between the armature and the membrane, in which the insert is provided with a bore through which the rod extends with clearance. The spring abuts with one end against the insert and with the other end against the armature. The spring is preferably a coil compression spring wound about the rod and the armature being provided about the rod with an axially extending cutout into which the coil spring extends with an end portion thereof. In this way, the dimension of the rod in axial direction can be held as small as possible. It is further advantageous when the insert is provided at the side thereof facing the armature with a substantially frustoconical depression tapering toward the membrane, and communicating with the control chamber through the aforementioned bore. Correspondingly, the armature has a frustoconical end portion facing the depression and tapering substantially in the same manner as the latter. The rod is not axially guided in the aforementioned bore through which the depression in the insert communicates with the control chamber, but the rod is guided in axial direction by its connection to the armature. The aforementioned bore through which the rod extends with clearance, permits therefore flow of water from the control chamber into the depression in the insert and vice versa. By means of the conical depression in the insert and the corresponding frustoconical form of the end portion of the armature a fine water dosage will be derived by hydrodynamic means and a very fast closing movement of the valve obtained since during closing movement of the valve the frustoconical end portion on the armature will assure a fast flow of water about the armature, on the one hand, through the bore to the control chamber, and on the other hand, to the other end of the armature. This will assure also that the valve will open slowly.

According to a further advantageous construction of the present invention the armature is provided on its peripheral surface, at which it is guided in a coaxial guide of the housing, with a plurality of axially extending grooves through which water may flow to the outer end of the armature. These grooves are preferably provided, uniformly spaced in circumferential direction from each other, on the outer peripheral surface of the armature. During movement of the armature in axial direction water will flow through these grooves in one or the other direction and thereby reduce the friction between the outer peripheral surface of the armature and the guide surface of the housing. The axially extending grooves have also the advantage that any dirt particles which may penetrate despite the sieve into the control chamber and in the space surrounding the armature will not cling to the outer surface of the latter and thereby increase the friction. A jamming of the armature is thereby positively prevented. The rod is provided on the free end thereof with abutment means provided with radial openings communicating with the annular clearance between the sleeve and the rod and the sleeve carrying the valve member abuts with one end against the aforementioned abutment means so that the sleeve with the valve member is taken along by the rod during movement of the latter in opening direction.

The armature and the insert are located in a bushing arranged in the housing and having an outer closed end. The bushing has an inner peripheral surface coaxial with the armature and guiding the latter for movement in axial direction. The interior of the bushing is filled with water and communicates with the control chamber. The bushing preferably has at its end facing the membrane an annular flange and the arrangement includes means for pressing the annular flange fluid-tightly against a corresponding annular portion of the membrane. Preferably the bushing has upwardly spaced from the annular flange an annular shoulder and the housing has a radially inwardly extending annular portion spaced from the shoulder and an annular pressure plate resting on the shoulder is pressed by compression spring means, preferably in the form of a corrugated spring washer, between the pressure plate and the inwardly extending housing portion against the shoulder, clamping thereby an outer annular portion of the membrane between the flange and an opposite housing portion, while simultaneously fluid tightly sealing the interior space flown through by water and formed by the aforementioned bushing and the membrane.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 illustrates an axial cross section through the valve according to the present invention and showing the valve in open position; and FIG. 2 is a top view of the armature of the valve, as viewed in the direction of the arrow II in FIG. 1.

DESCRIPTION OF THE PREFERRED EMBODIMENT

The valve according to the present invention is especially suitable for installation in a heating arrangement for motor vehicles as disclosed in the German Offenlegungsschrift No. 25 31 015. The valve is thereby arranged in a conduit leading to a non-illustrated heat exchanger. The electromagnet of the valve may thereby be controlled from a temperature regulating device of the heating arrangement.

The valve according to the present invention has a closed housing 11 provided with an inlet socket 12 and an outlet socket 13 respectively forming in the interior thereof an inlet chamber 14 and an outlet chamber 15 communicating with each other through an opening 16, forming a valve seat. A frustoconical valve member 17 is located in the inlet chamber and movable between an open position shown in the drawing and a closed position engaging the valve seat 16. The arrangement includes further a flexible membrane 18 axially spaced from the valve member 17 and fluid-tightly held along an outer peripheral portion in the housing 11. The membrane 18 forms on the side of the inlet chamber 14 facing away from the valve seat 16 a control chamber 19.

The means for moving the valve member 17 between the open and the closed position, comprises an electromagnet 10 provided with a magnet coil 20 and a dip armature 21 coaxially arranged in the interior of the magnet coil 20. The armature 21 is, upon energizing of the coil 20, movable in the direction of the arrow 22 against the force of a coil compression spring 23 biasing the armature in the opposite direction. The armature 21 is surrounded on all sides by water in the control chamber 19. A rod 24 coaxial with the valve seat 16 and extending through the latter is fixedly connected to the armature 21 for movement therewith in axial direction.

The valve member 17 and the membrane 18 are both connected to opposite ends of a sleeve 25. The sleeve 25 is axially movable on the rod and surrounds the latter with lateral clearance so that between the outer peripheral surface of the rod 24 and the inner peripheral surface of the sleeve 25 an annular space 26 is formed. The annular space 26 communicates at its upper end with the control chamber 19 and with its lower end with the inlet chamber 14, respectively the outlet chamber 15. The upper end of the sleeve 25 forms an enlarged auxiliary seat 27 for cooperation with an auxiliary valve member 28, which is preferably of frustoconical shape and formed of elastic material, for instance rubber. The auxiliary valve member 28 is fixedly connected to the rod 24 that is, to a portion of the latter between the lower end of the armature 21 and the upper end of the sleeve 25. The auxiliary valve member 28 together with the auxiliary valve seat 27 controls flow of water through the annular space 26.

The membrane 18 is provided with a throttle opening 29, through which the control chamber 19 communicates with the inlet chamber 14 and the cross-section of which is dimensioned in such a manner that during closing of the opening 16 a quick equalization of the pressure in the control chamber and the inlet chamber will occur by flow of water from the inlet chamber 14 through the throttle opening 29 to the control chamber 10 and so that during movement of the valve member 17 to the open position and preceding movement of the auxiliary valve member 28 away from the auxiliary valve seat 27 more water will flow through the annular space 26 out of the control chamber 19 than can flow thereinto from the inlet chamber 14 through the throttle opening 29.

A cylindrical sieve 30 is arranged with a radial distance about the sleeve 25 and the sieve is held against axial movement relative to the sleeve 25 between the valve member 17 and the membrane 18. The sieve 30 forms about the sleeve 25 an annular sieve space 31 which is closed at opposite ends by the valve member 17 and the membrane 18, respectively. The throttle opening 29 is arranged to communicate with the sieve space 31. The rod 24 carries at its lower free end an abutment 32 for the sleeve 25 and the valve member 17 connected thereto and this abutment is constructed as a grooved ring. The grooved ring has radial openings 33 through which the lower end of the annular space 26 continuously communicates with the inlet chamber 14, respectively, the outlet chamber 15, depending on the position of the valve member 17.

The housing 11 is closed in the region of the armature 21 towards the outside and about the armature 21 by a cup-shaped bushing 34, preferably formed from brass. Any gap in the central opening of the cover 35 and the cup-shaped bushing 34 extending therethrough is sealed with silicon rubber.

An insert 36 is fixed in the interior of the bushing 34 between the armature 21 and the membrane 18. The insert 36 is provided at the side thereof facing the armature 21 with a frustoconical depression 37, which tapers toward the membrane 18 and which is continued at its lower end by a bore 38, through which the rod 24 passes with clearance, so that the interior of the depression 37 is in communication with the interior of the control chamber 19. The spring 23 which biases the armature 21 in opening direction abuts with its lower end against the lower end of the depression 37, whereas the upper end of the coiled compression spring 23 which is wound about a rod 24 extends into an annular axially extending space formed in the lower portion of the armature 21 about the rod 24.

The armature 21 has a lower substantially frustoconical end portion 40 adapted to move into the depression 37 of the insert 36 and tapering in the same direction and substantially at the same angle as the depression 37. The substantially cylindrical upper portion of the armature 21 is coaxially guided on the inner peripheral surface of the bushing 34. The peripheral outer surface of the upper portion of the armature 21 is provided with a plurality of axially extending grooves 41 circumferentially equally spaced from each other through which water may pass from above or below the armature depending on the movement of the latter.

As can be seen from FIG. 1, the bushing 34 serves to receive in its interior the armature 21 and the insert 36 located beneath the armature. The cylindrical bushing 34 is closed at its upper end and its cylindrical inner surface forms a guide surface guiding the armature 21 for movement in axial direction. The interior of the bushing 34 is filled with water. The bushing 34 has adjacent its lower end an outwardly extending annular shoulder 44 and at its lower end a radially outwardly projecting flange 46, which abuts against an outer annular portion 47 of the membrane 18 and presses the latter against a correspondingly inwardly projecting portion of the housing 11. A pressure plate 43 rests on the aforementioned annular shoulder 44 of the bushing 34 and an axial compression spring 42, preferably formed by a corrugated spring washer, is sandwiched between the pressure plate 43 and an inwardly projecting portion of the housing 11 to thereby push the bushing 34 downwardly so as to press the annular flange 46 of the bushing 34 against the annular portion 47 of the membrane 18 to assure a fluid-tight connection of the membrane 18 to the housing 11.

The above-described arrangement will be operated as follows:

If the valve member 17 shown in the open position has to be moved to the closed position, the magnet coil 20 is energized. Thereby the armature 21 together with the rod 24 and the auxiliary valve member 28 connected thereto will first be moved in the direction of the arrow 22 and relative to the sleeve 25 so far that the auxiliary valve member 28 closes the auxiliary valve seat 27, whereby the up to this point open connection between the control chamber 19 over the annular space 26 with the inlet chamber 14 and the outlet chamber 15 is closed. During this axial movement of the armature 21 in downward direction the water located between the conical end portion 40 of the armature and the depression 37 will be displaced into the space between the upper end of the armature 21 and the upper closed end of the bushing 34 into which the water passes between the outer peripheral surface of the armature 21 provided with the longitudinally extending grooves 41 and the inner peripheral surface of the bushing 34. The grooves 41 facilitate thereby flow of water in the aforementioned direction. When the auxiliary valve member 28 engages the auxiliary valve seat 27, then the sleeve 25 is moved during further axial movement of the armature 21 and the rod 24 connected thereto in direction of the arrow 22, whereby the membrane 18 is resiliently deformed. Finally, the valve member 17 will engage the valve seat 16 and therewith interrupt flow of water from the inlet chamber 14 to the outlet chamber 15. During this movement of the valve member 17 in closing direction water will flow quickly through the throttle opening 19 in the membrane 18 from the inlet chamber 14 into the control chamber 19. This flow of water will support the closing movement of the valve. During the closing movement of the valve the compression spring 23 between the insert 36 and the armature 21 will be compressed. If the valve should now be opened, the magnet coil 20 has to be deenergized. The spring 21 can now expand to thereby move the armature 21 with the rod 24 and the auxiliary valve member 28 connected to the latter in the direction opposite to the direction indicated by the arrow 22, that is in opening direction. Thereby the auxiliary valve member 28 will be lifted from its auxiliary valve seat 27. The control chamber 19 can now communicate through the annular space 26 with the outlet chamber 15 in which a pressure lower than the pressure in the control chamber prevails. The pressure in the control chamber 19 will thus be lowered so that the water in the inlet chamber 14 of higher pressure acts on the membrane 18 in opening direction, supporting thereby the action of the expanding spring 23 to move the membrane 18, the sleeve 25 together with the sieve 30 and the valve member 17 in opening direction, so that water may flow from the inlet chamber 14 through the opening 16 into the outlet chamber 15. The throttle opening 29 is dimensioned in such a manner that during lifting of the auxiliary member 28 from the auxiliary valve seat 27 the pressure decrease in the control chamber by the outflow of water therefrom through the annular space 26 into the outlet chamber 15 will occur faster than flow of water from the inlet chamber 14 of higher pressure through the throttle opening 29 into the control chamber 19.

It will be understood that each of the elements described above, or two or more together, may also find a useful application in other types of valve arrangements differing from the types described above.

While the invention has been illustrated and described as embodied in a valve arrangement for use to control flow of hot water through a heating device for motor vehicles it is not intended to be limited to the details shown, since various modifications and structural changes may be made without departing in any way from the spirit of the present invention.

It is to be understood that the valve arrangement of the present invention may be used also for other purposes than mentioned above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve arrangement, especially for controlling flow of hot water through a heating device for motor vehicles, comprising a housing having an inlet chamber and an outlet chamber communicating with each other through an opening forming a valve seat; a valve member movable between an open position spaced from said valve seat and a closed position engaging said valve seat; means for moving said valve member between said positions thereof and comprising an electromagnet having a magnet coil coaxial with said valve seat, a dip armature axially movable within said coil in valve closing direction upon energizing of said coil, spring means cooperating with the armature and biasing the same in valve opening direction, a rod coaxially fixed to said armature and extending through and beyond said valve member, a sleeve arranged with radial clearance about a portion of said rod to be axially movable with respect thereto and having a lower end portion to the outer periphery of which said valve member is fixed and an upper end portion forming an auxiliary annular valve set, a flexible membrane having an inner peripheral portion fixed to the outer periphery of said upper end portion of said sleeve and an outer peripheral portion fixed to said housing to form to one side of said inlet chamber a control chamber, an auxiliary valve member to said rod between said armature and said sleeve and engaging during movement of said rod in valve closing direction said auxiliary valve seat before said valve member engages said valve seat; a throttle opening in said member providing communication between said control chamber and said inlet chamber and having an open cross section dimensioned so that during movement of said valve member to said closed position a quick flow of water from said inlet chamber into said control chamber and therewith a pressure equalization between said two chambers will be produced and so that during movement of the valve member to said open position with preceding movement of said auxiliary valve member away from said auxiliary valve seat more water will flow out of said control chamber through said clearance between said sleeve and said rod into said outlet chamber than can flow from said inlet chamber into said control chamber through said throttle opening; an insert mounted in said housing between said armature and said membrane, said insert being provided with a bore through which said rod extends with clearance, said spring abutting with one end against said insert and with its other end against said armature; a bushing in said housing, said armature and said insert being located in said bushing, said bushing having an outer closed end and an inner peripheral surface coaxial with said armature and guiding the latter for movement in axial direction, the interior of said bushing communicating with said control chamber and being filled with water, said bushing having at its end facing said membrane an annular flange and spaced from said flange a radially outwardly extending annular shoulder, said housing having a radially inwardly extending annular portion spaced from said shoulder; an annular pressure plate resting on said shoulder; and means for pressing said annular flange fluid-tightly against the corresponding annular portion of said membrane and comprising spring means between said pressure plate and said radially inwardly extending annular portion of said housing so as to press the annular flange of said bushing against said annular portion of said membrane by simultaneously fluid-tightly sealing the water filled interior space formed by said bushing and said membrane.

2. A valve arrangement as defined in claim 1, and including an annular sieve surrounding said sleeve with radial clearance and forming about said sieve an annular sieve spaced closed at opposite ends by said valve member and said membrane, respectively, said throttle opening in said membrane communicating with said sieve space.

3. A valve arrangement as defined in claim 1, wherein said auxiliary valve member is formed from elastic material.

4. A valve arrangement as defined in claim 1, wherein said auxiliary valve member is formed from rubber.

5. A valve arrangement as defined in claim 1, wherein said auxiliary valve member has a conical outer surface tapering toward said auxiliary valve seat so as to centralize upon engagement with said auxiliary valve seat said sleeve and said valve member fixed thereto relative to said rod.

6. A valve arrangement as defined in claim 1, wherein said spring is a coil compression spring wound about said rod, said armature being provided about the rod with an axially extending cutout into which said coil spring extends with an end portion thereof.

7. A valve arrangement as defined in claim 1, wherein said housing has a portion guiding said armature for movement in axial direction, said armature having a peripheral surface guided by said housing portion and being provided in said peripheral surface with axially extending grooves to permit flow of water in said housing from one to the other end of said armature.

8. A valve arrangement as defined in claim 7, wherein said grooves are arranged uniformly spaced from each other in circumferential direction of said peripheral surface of said armature.

9. A valve arrangement as defined in claim 1, wherein said rod has a free end, abutment means fixed to said free end of said rod and provided with radial openings communicating with said annular clearance between said sleeve and said rod and said inlet, respectively, said outlet chamber, said sleeve abutting with one end against said abutment means.

10. A valve arrangement as defined in claim 9, wherein said abutment means is constituted by a ring provided with grooves through which said annular clearance between said rod and said sleeve communicates continuously with said inlet respectively said outlet chamber.

11. A valve arrangement as defined in claim 1, wherein said compression spring means is constituted by a corrugated spring washer.

* * * * *